(12) United States Patent
Yoon et al.

(10) Patent No.: US 10,516,708 B2
(45) Date of Patent: Dec. 24, 2019

(54) METHOD FOR PROVIDING CONFERENCE SERVICE AND APPARATUS THEREOF

(71) Applicant: SAMSUNG SDS CO., LTD., Seoul (KR)

(72) Inventors: Hee Tae Yoon, Seoul (KR); Bo Mi Kim, Seoul (KR); Hwa Shin Lee, Seoul (KR); Shin Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 11 days.

(21) Appl. No.: 15/585,633

(22) Filed: May 3, 2017

(65) Prior Publication Data
US 2017/0324788 A1 Nov. 9, 2017

(30) Foreign Application Priority Data

May 3, 2016 (KR) .................. 10-2016-0054546

(51) Int. Cl.
*H04L 29/06* (2006.01)
*H04L 29/08* (2006.01)

(52) U.S. Cl.
CPC ........ *H04L 65/403* (2013.01); *H04L 65/1069* (2013.01); *H04L 65/1073* (2013.01); *H04L 67/24* (2013.01)

(58) Field of Classification Search
CPC ........................... H04L 67/24; H04L 65/1069
See application file for complete search history.

(56) References Cited

U.S. PATENT DOCUMENTS

| | | |
|---|---|---|
| 8,745,541 B2 | 6/2014 | Wilson et al. |
| 2013/0151623 A1* | 6/2013 | Weiser .................. H04N 7/147 709/205 |

* cited by examiner

*Primary Examiner* — Adnan M Mirza
(74) *Attorney, Agent, or Firm* — Sughrue Mion, PLLC

(57) ABSTRACT

Methods for providing conference service and apparatus thereof are provided, one of methods comprises, receiving identification information of a first user and identification information of a first terminal of the first user from the first terminal of the first terminal, receiving identification information of the first user and identification information of a second terminal of the first user from the second terminal of the first terminal, transmitting first contents to the first terminal of the first user and receiving at least one first reaction information about the first contents from the second terminal of the first user.

7 Claims, 13 Drawing Sheets

FIG. 5

| gesture | allocation |
|---|---|
| altitude change | voice request |
| right slope | agreement opinion |
| left slope | opposition opinion |
| overturning | request cancel |

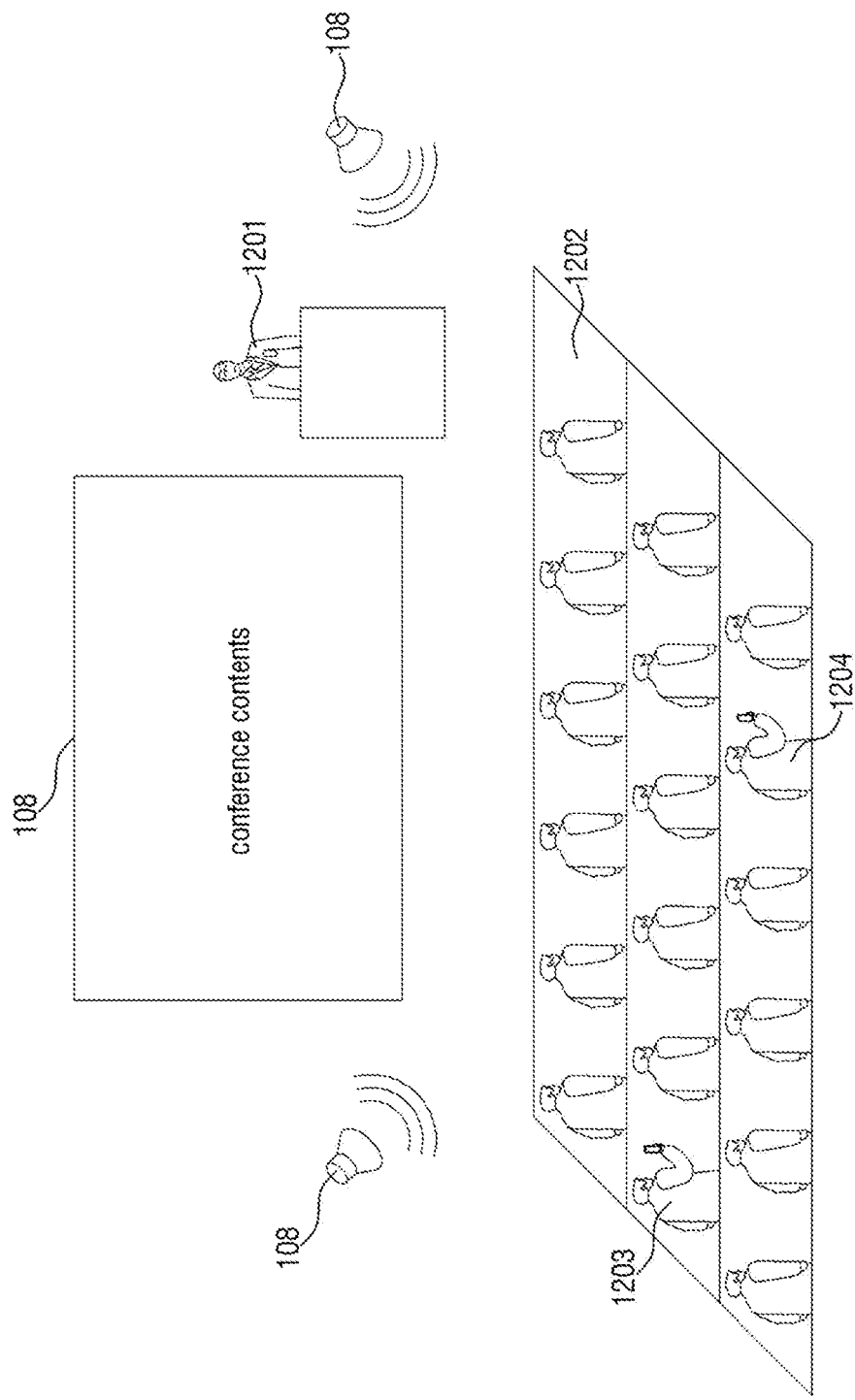

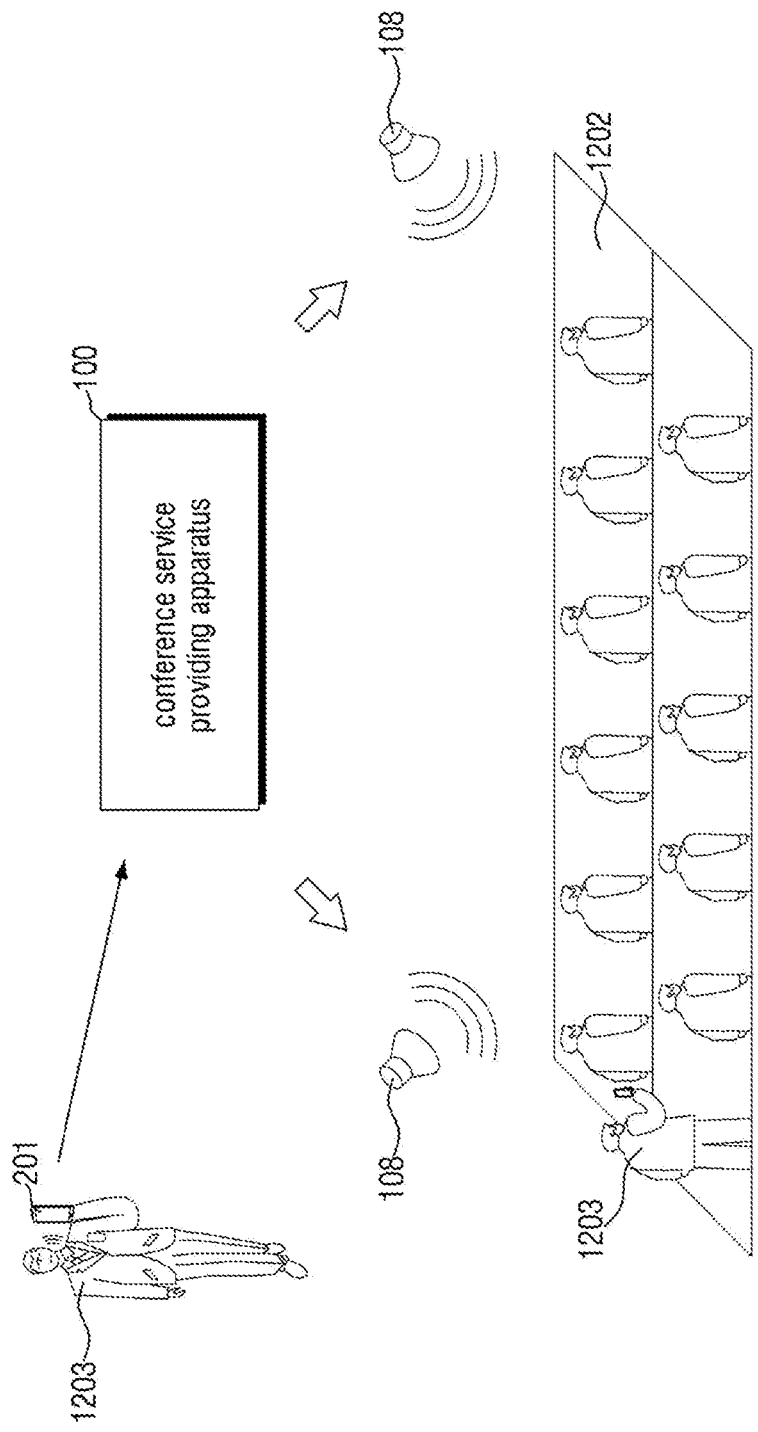

METHOD FOR PROVIDING CONFERENCE SERVICE AND APPARATUS THEREOF

This application claims the benefit of Korean Patent Application No. 10-2016-0054546, filed on May 3, 2016, in the Korean Intellectual Property Office, the disclosure of which is incorporated herein by reference in its entirety.

BACKGROUND

1. Field of the Invention

The present invention relates to a method for providing a conference service and an apparatus thereof. More particularly, the present invention relates to a method for providing a conference service, by which a realistic conference service can be provided by receiving information associated with conference participation from conference participants' personal terminals, and an apparatus thereof.

2. Description of the Related Art

With the development of communication technology, there is provided a real-time conference service among a plurality of participants located in different spaces.

Such a real-time conference service has an advantage of allowing participants located in different spaces to participate in the conference, but has a disadvantage of a realistic sensation becoming inferior. Since participants participate in a conference through terminals in a separate space, there occur problems that the concentration on the conference is lowered and that a desire for participating in the conference is lowered depending on the degree of communication status or the degree of mastery of terminal operations.

azMeanwhile, when a large number of persons participate even in a conference held in the same space rather than in different spaces, there is also a problem that the conference does not proceed smoothly as a number of persons want to speak at the same time.

Nevertheless, conference services for improving the reality and concentration of a conference and smoothly performing the conference in the presence of a large number of participants are not provided.

Further, a method of effectively controlling the terminals of conference participants according to circumstances is also not provided.

SUMMARY

An aspect of the present invention is to provide a method for providing a conference service, in which realistic sensation can be provided to conference participants through a plurality of terminals in a separate space, and an apparatus thereof.

Another aspect of the present invention is to provide a method for proving a conference service, in which, among a plurality of terminals, a first terminal outputs conference contents provided by a conference service providing apparatus, and a second terminal transmits information about conference participation to the conference service providing apparatus.

Still another aspect of the present invention is to provide a method for providing a conference service, in which, when there is a situation where conference contents cannot be received through a terminal connected to a conference service, the conference contents can be received through another terminal.

Still another aspect of the present invention is to provide a method for providing a conference service, in which a large number of participants can participate in a conference through their own terminals.

However, aspects of the present invention are not restricted to the one set forth herein. The above and other aspects of the present invention will become more apparent to one of ordinary skill in the art to which the present invention pertains by referencing the detailed description of the present invention given below.

In some embodiments, a method for proving a conference service, the method comprises, receiving first identification information of a first user and second identification information of a first terminal of the first user from the first terminal of the first terminal, receiving the first identification information of the first user and third identification information of a second terminal of the first user from the second terminal of the first terminal, transmitting first content to the first terminal of the first user and receiving from the second terminal of the first user, first reaction information about the first content.

BRIEF DESCRIPTION OF THE DRAWINGS

The above and other aspects and features of the present invention will become more apparent by describing in detail exemplary embodiments thereof with reference to the attached drawings, in which:

FIG. 5 is an illustration for explaining the relationship between the gesture input to a terminal and the request information assigned to the terminal, which is referred to in some embodiments of the present invention;

FIG. 12 is an exemplary diagram for explaining the environment for providing a conference service in a conference in which a large number of participants participate according to still another embodiment of the present invention; and FIG. 13 is an exemplary diagram for explaining a process of outputting user contents through user terminals, which is referred to in some embodiments of the present invention.

DETAILED DESCRIPTION OF THE EMBODIMENTS

All terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Hereinafter, preferred embodiments of the present invention will be described with reference to the attached drawings.

Figure 1:
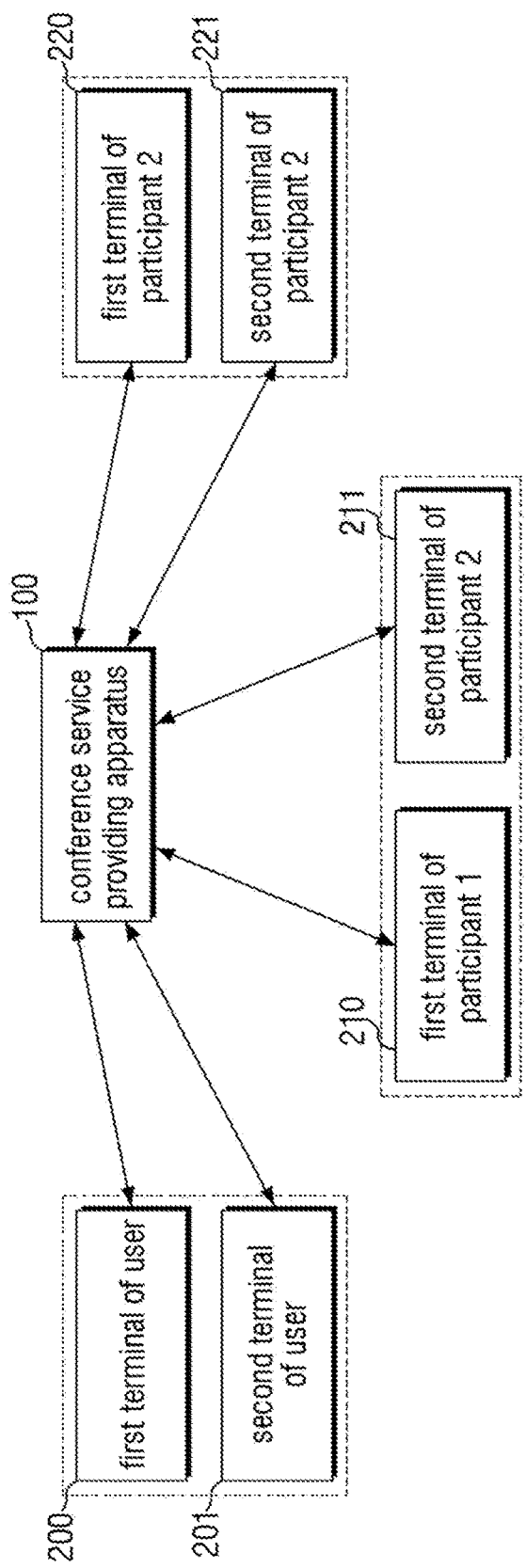
FIG. 1 is a block diagram of a conference service providing system according to an embodiment of the present invention.

FIG. 1 is a block diagram of a conference service providing system according to an embodiment of the present invention.

Referring to FIG. 1, a conference service providing system may include a conference service providing apparatus 100 and a plurality of terminals. In particular, FIG. 1 illustrates an example in which a user and participants receive a conference service using a first terminal and a second terminal, respectively. In this case, the conference service providing apparatus 100, which is a computing apparatus capable of communicating with the plurality of terminals shown in FIG. 1, may be a server for providing a real-time conference service to the plurality of terminals.

The user may transmit identification information of the user to the conference service providing apparatus 100 through the first terminal 200 and the second terminal 201. The first terminal 200 and the second terminal 201 may transmit identification information of the first terminal 200 and identification information of the second terminal 201, respectively, in addition to the identification of the user. Here, the "user" refers to a person whose identification information is registered in the conference service providing apparatus 100 to become a participant from the conference service providing apparatus 100 and who uses the first terminal 200 and the second terminal 201 as the participant.

The conference service providing apparatus 100 may register the user as a conference participant and register the first terminal 200 and the second terminal 201 as terminals of the conference participants, based on the received information.

It is illustrated in FIG. 1 that the first terminal 210 and second terminal 211 of participant 1 and the first terminal 220 and second terminal 221 of participant 2 are terminals of other participants (participant 1 and participant 2) who participate in the conference prior to the user. The first terminals 210 and 220 and the second terminals 211 and 221 may be terminals registered in the conference service providing apparatus 100.

The conference service providing apparatus 100 may detect the connection status of each participant for each terminal. The conference service providing apparatus 100 may transmit conference contents (hereinafter, referred to as "first contents") to the first terminals 200, 210 and 220 of each participant. Here, the first contents may include videos, images, texts, tables, graphs, and the like. Further, in terms of contents, the first contents may include tables of contents, topics, and details of a conference.

The conference service providing apparatus 100 may receive reaction information about the first contents from the second terminals 201, 211, and 221 of each participant. Here, the reaction information may be a participation request in a participant's conference procedure. For example, the reaction information may include a request for a voice associated with the first contents, agreement on topic, a request for claiming opposition, a request for voting on decisions, and a request for a voice for a response to another participant's remarks. That is, the reaction information, in the procedure of a conference, may include a request for all contents, by which a participant can deliver a message to the first contents. The reaction information may be generated at the second terminal, and may be generated by the gesture input of each participant to the second terminals 201, 211 and 221. The gesture input may include a touch gesture input and a motion gesture input with respect to the second terminals 201, 211 and 221 of each participant.

The number of users and participants and the number of terminals used by the users and participants are set forth to illustrate the present invention, and the conference service providing system is not limited thereto. Further, even in the case of the user, a plurality of terminals of a plurality of users, such as a first user and a second user, may be included in the conference service providing system. Hereinafter, the embodiment of a user and first and second terminals of the user may include the embodiment of a plurality of users and first and second terminals of the plurality of users.

Further, the embodiment of the first terminal may be equally applied to the embodiment of the second terminal. Furthermore, the embodiment of the first terminal may also be executed simultaneously even in the second terminal.

Each of the first terminals 200, 210, and 220 shown in FIG. 1 may be a fixed or mobile computing device. For example, each of the first terminals 200, 210, and 220 may be a desktop PC or a laptop PC. Each of the first terminals 200, 210, and 220 may include various devices for receiving a conference service.

Each of the second terminals 201, 211, and 221 shown in FIG. 1 may be a mobile computing device. For example, each of the second terminals 201, 211, and 221 may be a smart phone or a PDA. Each of the second terminals 201, 211, and 221 may include various devices for participating in a conference service.

Figure 2:
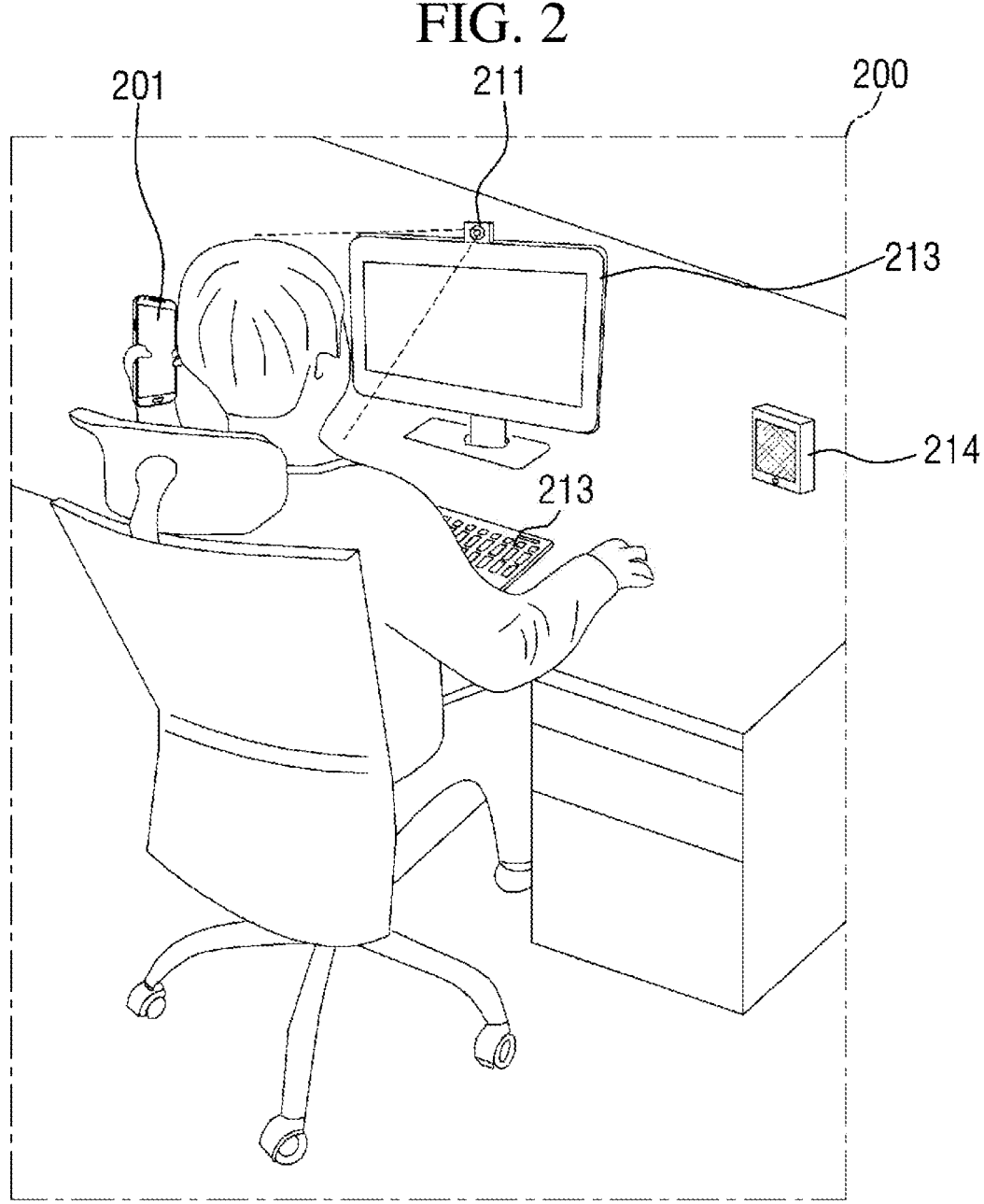
FIG. 2 is an illustration of a plurality of terminals connected to a conference service providing apparatus according to another embodiment of the present invention.

FIG. 2 is an illustration of a plurality of terminals connected to a conference service providing apparatus according to another embodiment of the present invention.

Hereinafter, a description of first terminals is commonly applied to the first terminal 200 of a user and the first terminals 210 and 220 of participant 1 and participant 2. Further, a description of second terminals is commonly applied to the second terminal 201 of a user and the second terminals 211 and 221 of participant 1 and participant 2.

Referring to FIG. 2, the first terminal 200 may include at least one input device and at least one output device. In FIG. 2, a camera 211 for receiving video information from a user and a keyboard 212 for text input are shown as examples of the input device of the first terminal 200. Further, in FIG. 2, a monitoring device 213 for providing video information to a user and a speaker 214 for providing audio information to a user are shown as examples of the input device of the first terminal 200. Meanwhile, a smart phone is shown as an example of the second terminal.

The user may access the first contents using the first terminal 200 and the second terminal 201, and may generate reaction information about the accessed first contents. The conference service providing apparatus 100 may recognize the first terminal 200 as a main terminal and the second terminal 201 as a sub terminal according to a role of sharing in a conference service providing process.

Figure 3:
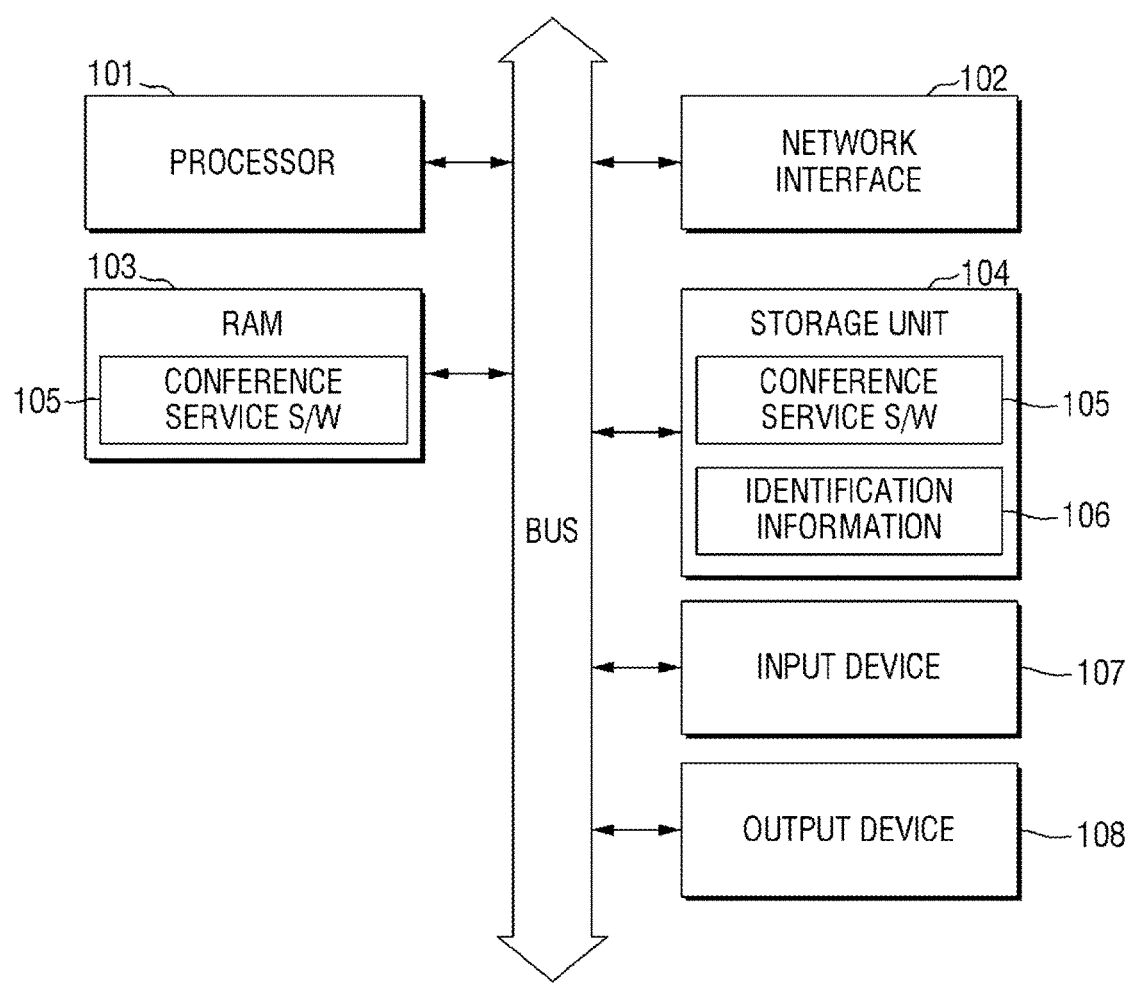
FIG. 3 is a block diagram of a conference service providing apparatus according to still another embodiment of the present invention.

FIG. 3 is a block diagram of a conference service providing apparatus according to still another embodiment of the present invention.

Hereinafter, the structure and operation of the conference service providing apparatus 100 will be described in detail with reference to FIG. 3.

Referring to FIG. 3, the conference service providing apparatus 100 may include at least one processor 101, a network interface 102 communicating with a plurality of terminals, a memory unit 103 loading computer program executed by the processor 101, a storage unit 104 storing computer program, an input device 107, and an output device 108.

The processor 101 controls the overall operation of each configuration of the conference service providing apparatus 100. The processor 101 may be configured to include a central processing unit (CPU), a micro processor unit (MPU), a micro controller unit (MCU), or any type of processor well known in the art. Further, the processor 101 may perform operations on at least one application or program for performing the methods according to embodiments of the present invention. The conference service providing apparatus 100 may include one or more processors.

The network interface 102 supports wired/wireless internet communication of the conference service providing apparatus 100. Further, the network interface 102 may support various communication methods in addition to internet communication. For this purpose, the network interface 102 may be configured to include a communication module well known in the art.

The network interface 102 may transmit and receive data to and from the plurality of terminals 200, 201, 210, 211, 220 and 221 shown in FIG. 1 through a network. Further, the network interface 102 may transmit and receive control commands for activating the input device and/or output device constituting each terminal to and from each of the plurality of terminals 200, 201, 210, 211, 220 and 221.

The memory unit 103 stores various data, commands and/or information. The memory 103 may load one or more programs 105 from the storage unit 104 in order to perform the synchronization method according to embodiments of the present invention. In FIG. 3, RAM is shown as an example of the memory unit 103.

The storage unit 104 may non-temporarily store the one or more programs 105 and identification information 106. In FIG. 3, conference service software 105 is shown as an example of the one or more programs 105.

The storage unit 104 may be configured to include volatile memory such as read only memory (ROM), erasable programmable ROM (EPROM), electrically erasable programmable ROM (EEPROM) or flash memory, a hard disk, a removable disk, or any type of computer-readable recording medium well known in the art.

The conference service providing apparatus 100 may provide a conference service to a plurality of terminals through the conference service software 105 when the plurality of terminals are registered in the conference service providing apparatus 100 for each user and participant according to the embodiment of the present invention. Further, the conference service providing apparatus 100 may provide a conference service to one terminal through the conference service software 105 when the one terminal is registered in the conference service providing apparatus 100 for each user and participant according to the embodiment of the present invention.

The identification information 106 may store identification information of users and identification information of first and second terminals. Here, the identification information of users may refer to personal information such as user's name, ID, login information and nickname, which can allow the conference service providing apparatus 100 to indentify conference participants providing a conference service. Further, the identification information of first and second terminals, which is unique information about a terminal provided with the conference service, may be, for example, MAC address information of the terminal.

The input device 107 may be a device capable of receiving a command for granting a voice to a specific participant when an administrator managing the conference service providing apparatus 100 inputs this command. For example, the input device 107 may be a keyboard or a mouth, but the present invention is not limited thereto.

The output device 108 may include a monitoring device for displaying video information among the first contents in a conference place, a speaker device for outputting audio information among the first contents in the conference place, and the like.

Figure 4:
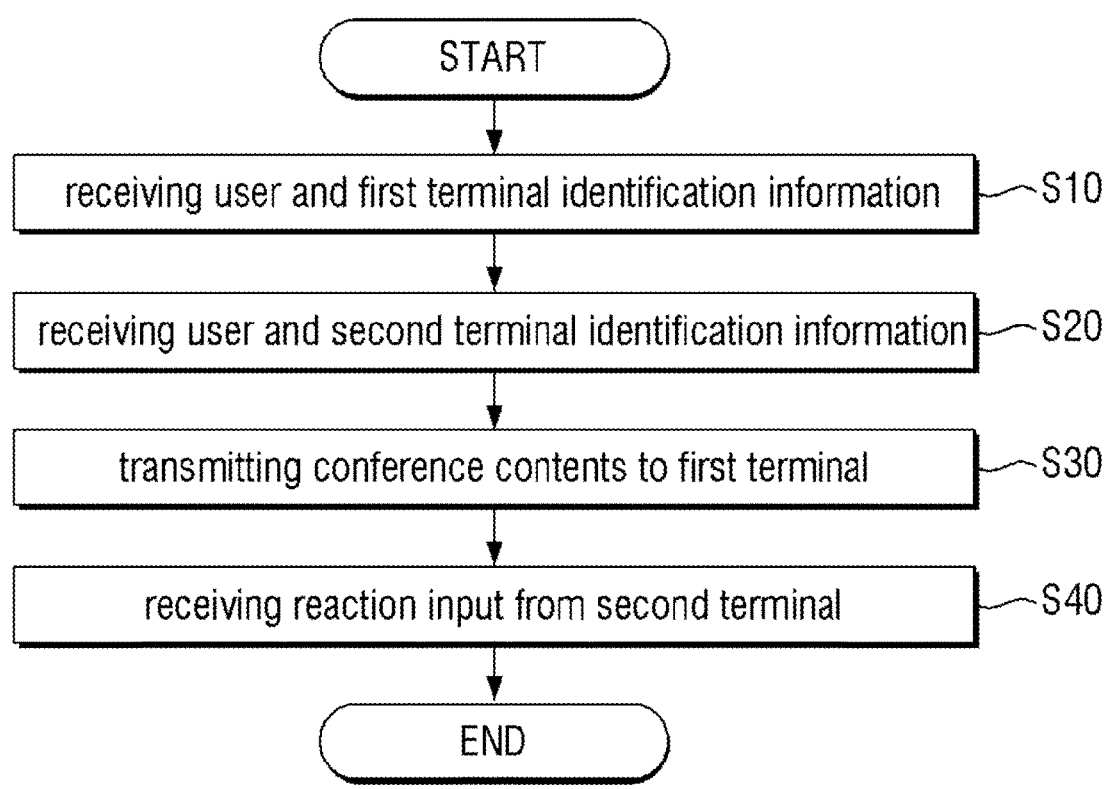
FIG. 4 is a flowchart of a method for providing a conference service according to still another embodiment of the present invention.

FIG. 4 is a flowchart of a method for providing a conference service according to still another embodiment of the present invention. FIG. 5 is an illustration for explaining the relationship between the gesture input to a terminal and the request information assigned to the terminal, which is referred to in some embodiments of the present invention.

Each of the following steps is performed by the conference service providing apparatus 100, and, particularly, is performed by allowing the processor to perform an operation according to the conference service software 105.

Referring to FIG. 4, the conference service providing apparatus 100 may receive the identification information of the user and the identification information of the first terminal of the user from the first terminal 200 of the user (S10). The conference service providing apparatus 100 may receive the identification information of the user and the identification information of the second terminal of the user from the second terminal 201 of the user (S20).

At this time, the conference service providing apparatus 100 may register the first terminal 200 of the user and the second terminal 201 of the user as terminals of conference participants, respectively, based on the identification information of the user. At this time, the conference service providing apparatus 100 may match and store the identification information of the user and the identification information of the first terminal 200 and the second terminal 201.

The conference service providing apparatus 100 may transmit the first contents to the first terminal 200 (S30). In addition, the conference service providing apparatus 100 may receive reaction information about the first contents from the second terminal 201 (S40). At this time, the reaction information may include information generated by a user's gesture input to the second terminal 201. For this purpose, the second terminal 201 may be provided with various sensors for receiving the gesture input. For example, the second terminal 201 may be provided with at least one of a gyroscope sensor, an acceleration sensor, and a geomagnetic sensor.

The conference service providing apparatus 100 may identify a pre-allocated request for the received reaction information. That is, the conference service providing apparatus 100 may extract the request information corresponding to the reaction information based on the received reaction information.

In FIG. 5, altitude change, right slope, left slope, overturning, and direction change are shown as examples of the gesture input of the user performed to the second terminal 201. For example, when the second terminal 201 is a smart phone, the altitude change is a motion gesture that allows the user to move the smart phone up and down. Further, the overturning may be a motion gesture that allows the user to point the screen of the smart phone down.

When the user performs the motion gesture to the second terminal 201, the second terminal 201 generates information according to this. In addition, the generated signal is input to the conference service providing apparatus 100 through the second terminal 201. At this time, the generated information input to the conference service providing apparatus 100 is reaction information. The conference service providing apparatus 100 may match and store pre-allocated request information for each of the reaction information.

Referring to FIG. 5, examples of the pre-allocated request information may include request for voice, request for a vote of support or opposition, and request for cancelling specific request. For example, when the user changes the altitude of the second terminal 201, the content service providing apparatus 100 may receive the reaction information to determine that the user of the second terminal 201 has requested the voice.

Next, the conference service providing apparatus 100 may reflect the contents generated in the second terminal of the user to the first contents in response to the extraction of the pre-allocated request information. The conference service providing apparatus 100 may generate contents (hereinafter, referred to as second contents) corresponding to the extracted request information. The second contents may include a control command for activating at least one input device or output device of the second terminal of the first user associated with the attribute of the first contents.

As the pre-allocated request is identified in the conference service providing apparatus 100, the user is provided with the opportunity to generate user contents through the second terminal 201. Accordingly, the second terminal 201 may receive user input and generate user contents. The conference service providing apparatus 100 may receive the user contents generated from the second terminal 201 and reflect these user contents on the first contents. Hereinafter, the contents in which the user contents are reflected in the first contents may be referred to as third contents.

The conference service providing apparatus 100 may transmit the first contents or the third contents to at least one of the first terminals 200, 210 and 220 and the second terminals 210, 211 and 212 of the conference participants.

The conference service providing apparatus 100 may transmit the first contents or the third contents to any one of the first terminal and second terminal of any one participant. That is, when the user contents of the user are received while receiving the first contents, the conference service providing apparatus 100 may generate the third contents using the received user contents and transmit these third contents to at least one of the first terminals 200, 210 and 220 and the second terminals 210, 211 and 212 of the conference participants. At this time, the conference service providing apparatus 100 may identify the main terminal among the first terminal and the second terminal and transmit the first contents or the third contents to the identified main terminal.

Further, the conference service providing apparatus 100 may transmit a control command for controlling at least one of an input device and an output device related to the attribute of the first contents to be transmitted. For example, when the first contents are video information, the conference service providing apparatus 100 may transmit a control command for activating the monitor 213 of the first terminal to the first terminal in order to display the video information. In this case, the monitor 213 is activated, and the first contents are displayed on the activated monitor 213.

Meanwhile, since the reaction information is generated as a gesture input to the second terminal 201 of the user, reaction information irrelevant to the first content may be generated. For example, it is the case that the pre-allocated request is a voice request, even though a vote for agree or opposition of a certain topic.

In this case, when the conference service providing apparatus 100 identifies the pre-allocated request information from the received reaction information, it may determine whether the identified request information is an input that matches the first contents being transmitted to the first terminal of the user. As a result of the determination, when the identified request information is an input that matches the first contents being transmitted to at least one of the first terminal 200 and the second terminal 201, the conference service providing apparatus 100 may reflect the generated user contents to the first contents. That is, when the transmitted contents do not match the identified contents, the conference service providing apparatus 100 does not reflect the generated user contents to the first contents.

Figure 6:
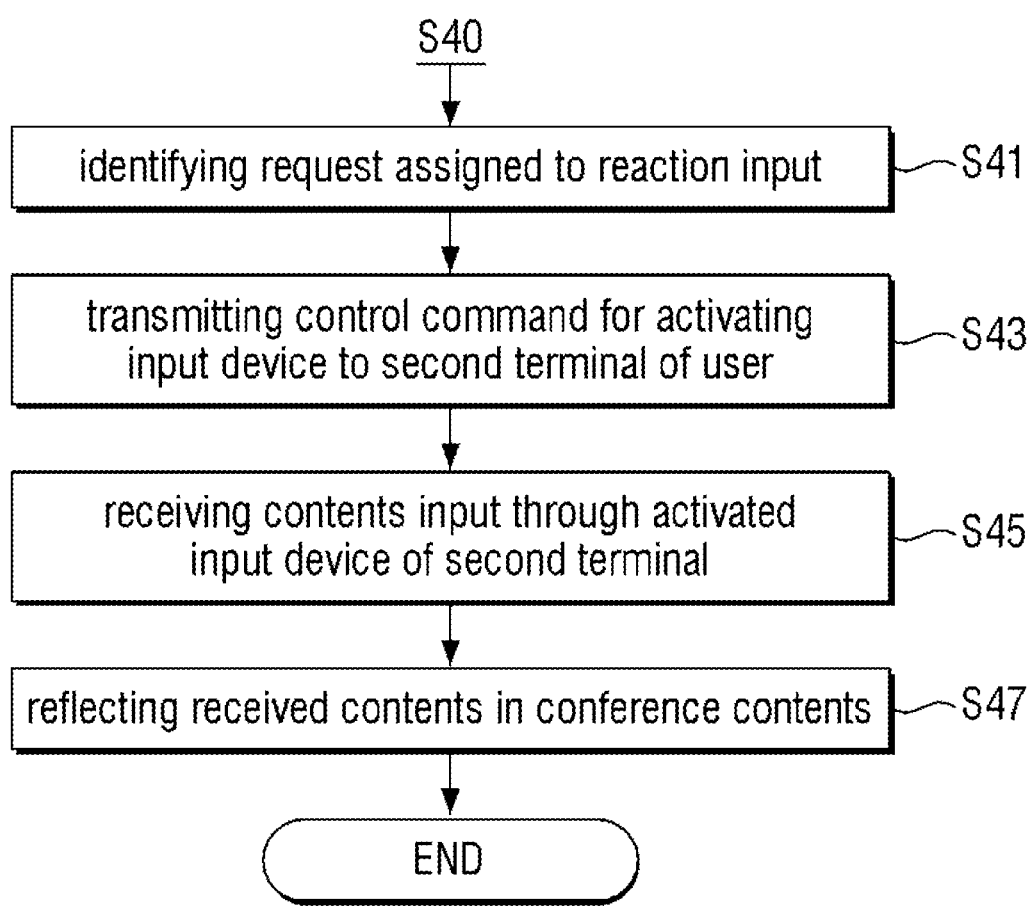
FIG. 6 is a flowchart of a method of reflecting user input contents to conference contents according to still another embodiment of the present invention.

Hereinafter, a method of reflecting the contents generated in the second terminal 201 to the first contents will be described with reference to FIG. 6. FIG. 6 is a flowchart of a method of reflecting user input contents to first contents according to still another embodiment of the present invention.

In step 40 (S40), the conference service providing apparatus 100 may transmit a control command for activating at least one input device of the second terminal 201 to the second terminal 201 in response to the identification (S41) of the pre-allocated request information (S43). For example, when the second terminal 201 includes a camera, a touch screen, or a microphone and the pre-allocated request information is voice request information, the conference service providing apparatus 100 may transmit a control command for activating the microphone of the second terminal 201 to the second terminal 201.

In this case, the user may input audio contents through the microphone of the second terminal 201.

The conference service providing apparatus 100 receives the content input through the at least one input device activated by the control command from the second terminal of the user (S45), and may reflect the user contents input through the at least one input device to the first contents (S47). That is, third contents are generated. In the above example, when the audio contents input to the second terminal 201 are input, the conference service providing apparatus 100 may receive the audio contents and reflect these audio contents on the first content being output. In this case, the conference service providing apparatus 100 may output the audio contents through the speaker of the output device 108. That is, when the conference service providing apparatus 100 is outputting video information as the first contents through the monitor of the output device 108, the audio contents may be output through the speaker in addition to the image being output.

Figure 7:
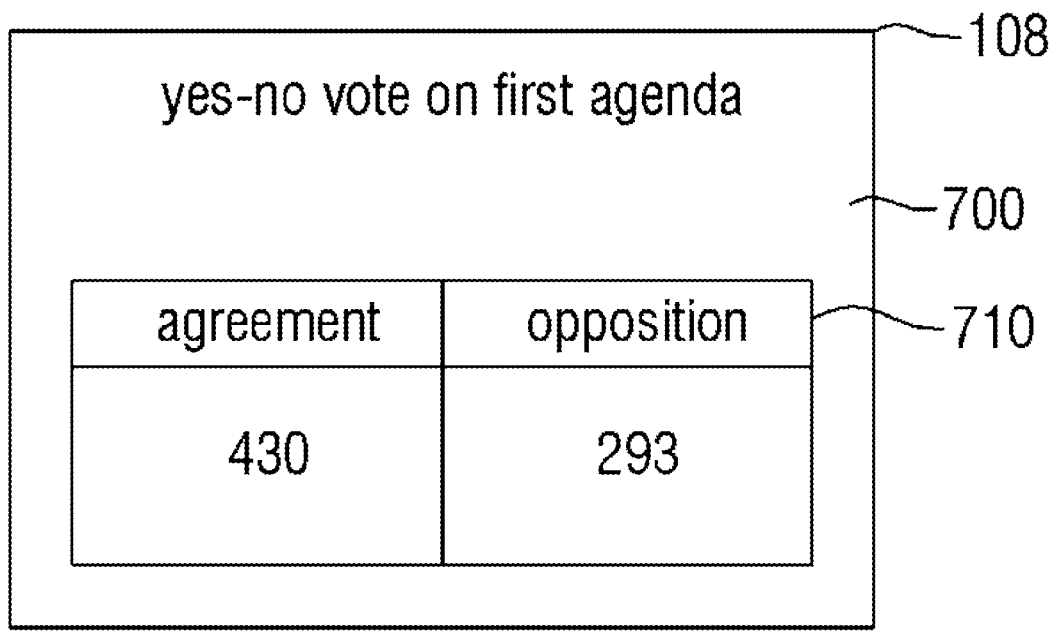
FIGS. 7 to 9 are illustrations of conference contents reflected with user input contents, which are referred to in some embodiments of the present invention.
Figure 8:
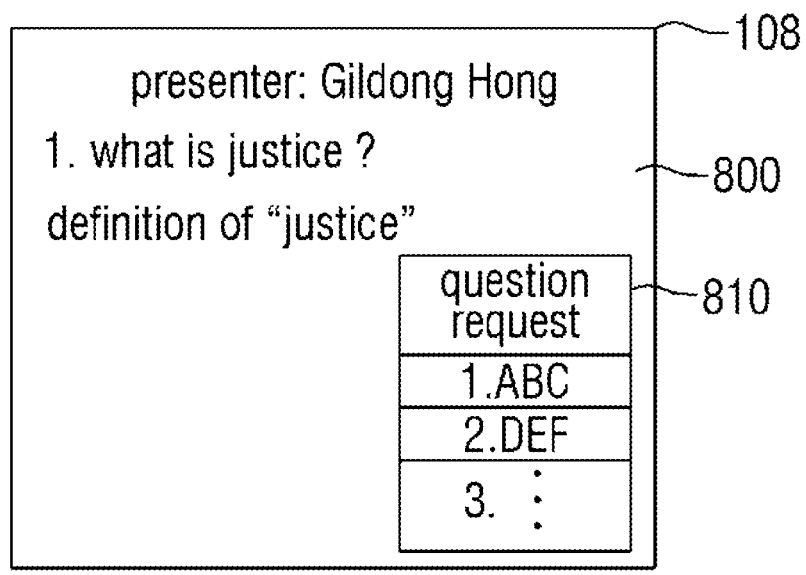
Figure 9:
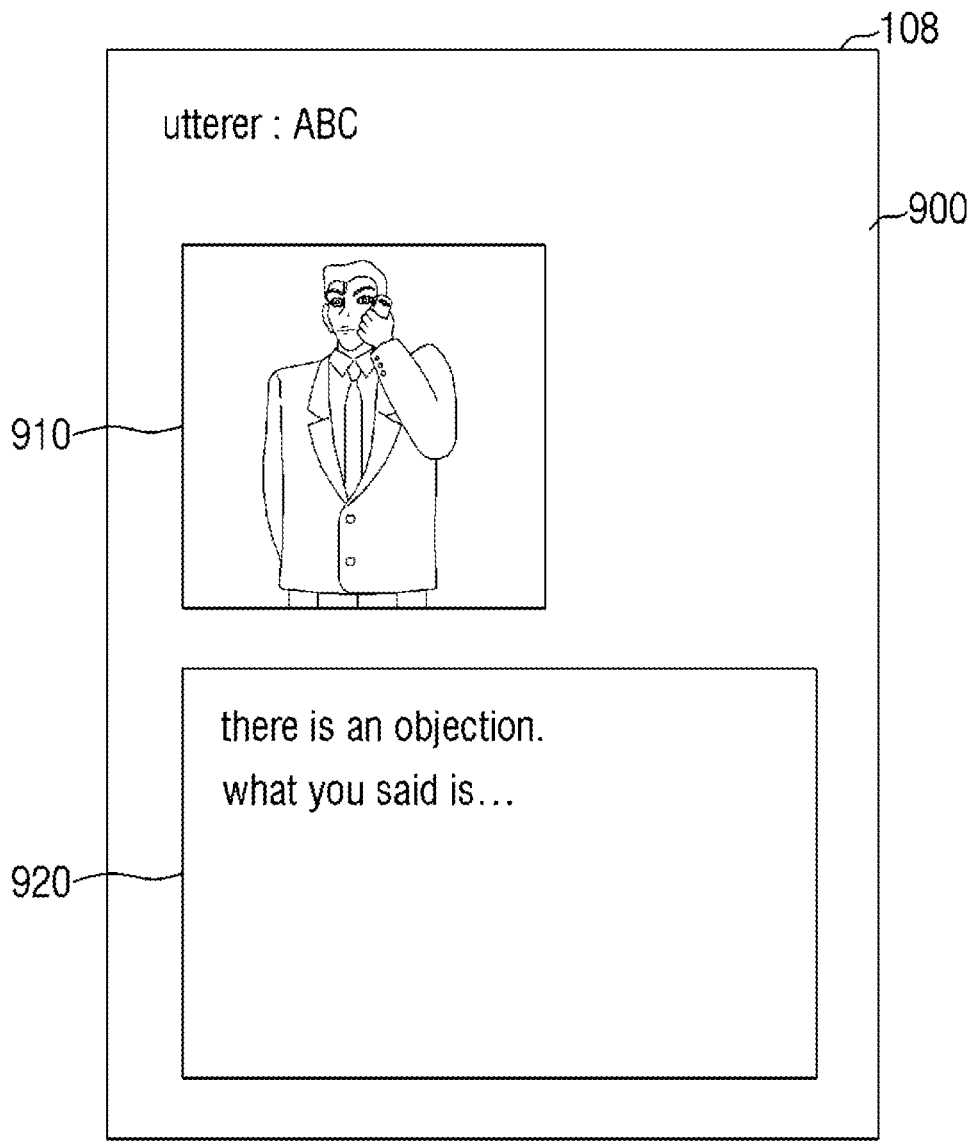

FIGS. 7 to 9 are illustrations of third contents generated by reflecting user input contents on first contents, which are referred to in some embodiments of the present invention.

In FIG. 7, an example in which first contents are video information for yes-no vote on a certain topic. In this case, the conference service providing apparatus 100 may output the first contents 700 through the output device 108. A case where the pre-allocated request indicates an agreement opinion or an opposition opinion shown in FIG. 5 will be described as an example. When the conference service providing apparatus 100 is outputting first contents 700, reaction information may be received from the second terminal 201. The user of the second terminal 201 may apply a motion input to the second terminal 201 in order to generate the reaction information. At this time, the request information assigned to the reaction information generated when the motion input is an input tilting the second terminal 201 toward right indicates an agreement opinion.

The conference service providing apparatus 100 may reflect the user contents 710 generated by the agreement opinion on the first contents 700 to the first contents 700 and may output the same. At this time, the output contents are third contents. At this time, the contents 710 may generate not only the second terminal 201 of the user but also the second terminals of other participants together.

In FIG. 8, the first contents 800 may be specific presentation data, and an utterer may be presenting the first contents 800. In this case, the first contents 800 may include audio contents uttered by the utterer.

A case where the pre-allocated request information is voice request information shown in FIG. 5 will be described as an example. When the conference service providing apparatus 100 is outputting first contents 800, reaction information may be received from the second terminal 201. The user of the second terminal 201 may apply a motion input to the second terminal 201 in order to generate the reaction information. At this time, the request information assigned to the reaction information generated when the motion input is an input changing the altitude of the second terminal 201 indicates a voice request.

The conference service providing apparatus 100 may reflect the user contents 810 generated by the voice request on the first contents 800 to the first contents 800 and may output the same. At this time, the contents 810 may generate not only the second terminal 201 of the user but also the second terminals of other participants together.

Particularly, in FIG. 8, the contents 810 may be determined by the priority assigned to the second terminal of the user and the second terminals of other participants, respectively. A method of determining the priority will be described later with reference to FIG. 10.

Next, a voice opportunity may be granted to the user in response to the voice request. The conference service providing apparatus 100 may a control command for activating a microphone, which is an input device of the second terminal 201, in response to the identification of the pre-allocated request into the voice request. When the microphone is activated, the user may input audio contents to the second terminal 201. Accordingly, the conference service providing apparatus 100 may receive the audio contents and reflect these audio contents to the first contents 800. That is, the conference service providing apparatus 100 may display the first contents 800 and output the audio contents through a speaker. Like this, even if the first contents and the user's audio contents are outputted through a separate device, when the first contents and the user contents are overlapped and output, the overlapped and output contents may be considered as the third contents.

In FIG. 9, a case where the first contents 900 are information about a speaker who is uttering is shown as an example. In the above example, when the user is inputting audio contents through the microphone of the second terminal 201 according to the utterance request, the conference service providing apparatus 100 may output the information 900 about the utterer who is uttering. At this time, the conference service providing apparatus 100 may receive video information 910 about the user who is uttering through a camera, which is the input device 107, and may reflect the video information 910 on the first content 900. Further, according to another embodiment of the present invention, when the user inputs audio contents to the second terminal 201, the conference service providing apparatus 100 may also receive the audio contents to generate text contents.

In this case, the first contents 900 may also reflect text contents 920, which are user contents. In this regard, the first contents 900, as third contents, may be changed dynamically according to the conference situation.

Figure 10:
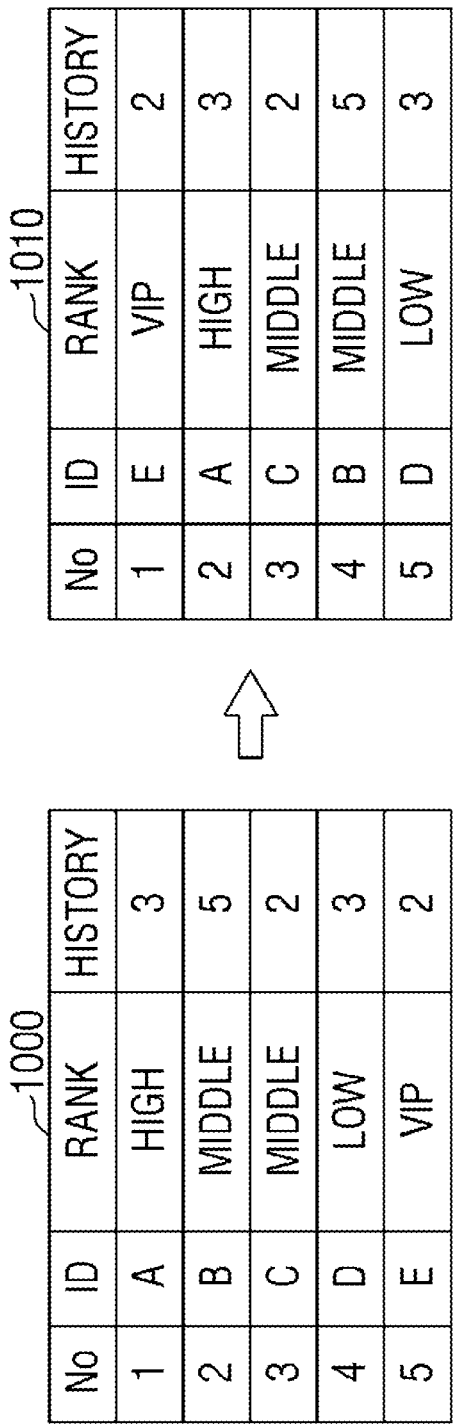
FIG. 10 is an illustration for explaining a method of determining the priority of participants' conference participation requests, which is referred to in some embodiments of the present invention.

FIG. 10 is an illustration for explaining a method of determining the priority of participants' conference participation requests, which is referred to in some embodiments of the present invention.

In step 50 (S50), the conference service providing apparatus 100 may receive reaction information from the second terminal 201 of the user and the second terminals 211 and 221 of other participants. The conference service providing apparatus 100 may determine the priority between the reaction information received from the second terminal 201 of the user and the reaction information received from the second terminals 211 and 221 of the other participants. In this case, in step 57 (S57), the conference service providing apparatus 100 may determine whether to reflect the user contents generated in the first contents based on the determined priority.

Specifically, in step 57 (S57), the conference service providing apparatus 100 may identify the terminal that has transmitted the reaction information with the highest priority determined. The conference service providing apparatus 100 may transmit a control command for activating at least one input device of the identified terminal to the identified terminal.

The identified terminal may receive input of contents from the user through at least one input device of the terminal identified according to the control command. Accordingly, the conference service providing apparatus 100 may reflect the contents input to at least one input device to the first contents.

The criteria for priority determination are not limited to specific criteria. Hereinafter, two criteria will be described below.

First, the priority may be determined based on the identification information of the user. In this case, the priority information may be preset in the identification information.

The conference service providing apparatus 100 may receive the identification information of other participants from the second terminals of the participants other than the user. In this case, the determination of priority may be performed based on the identification information of the user and the identification information of the other participants, which are received by the conference service providing apparatus 100. For example, when there is a VIP among participants of the conference, the conference service providing apparatus 100 may grant priority to the VIP.

Second, the priority may be determined according to the reception history of the reaction information.

The conference service providing apparatus 100 may determine the priority based on the history of the reaction information received from the second terminal of the user and the history of the reaction information received from the second terminals of the other participants. For example, as the result of checking the history of the received reaction information, when the user obtains a lot of speaking opportunities by performing a lot of voice requests, the conference service providing apparatus 100 may determine the priority of the user to be low. Generally, it is considered that opportunities to speak at the conference are provided equally to participants. The conference service providing apparatus 100 may lower the priority of the user based on the history, and may adjust the priority of other participants who have not gained many opportunities to speak in the history.

The criteria of priority determination are not limited to the above example. A plurality of criteria may also be used for priority determination.

Referring to FIG. 10, when a plurality of voice requests is received, the conference service providing apparatus 100 accumulates the plurality of voice requests in the order in which the voice requests are received, such as a list 1000. At this time, the conference service providing apparatus 100 may determine the highest priority of the VIP using ID and E based on user identification information. Further, the priority of user A having the highest rank in the user identification information may be determined as the next priority of user E. User C maintains the priority thereof, but the priority of user C may be set higher than the priority of user B because it is lower than that of user B in the history of voice requests. Accordingly, the conference service providing apparatus 100 may generate a list 1010. The conference service providing apparatus 100 may sequentially activate the microphones of the second terminals of the user and the participants based on the generated list 1010.

Figure 11:
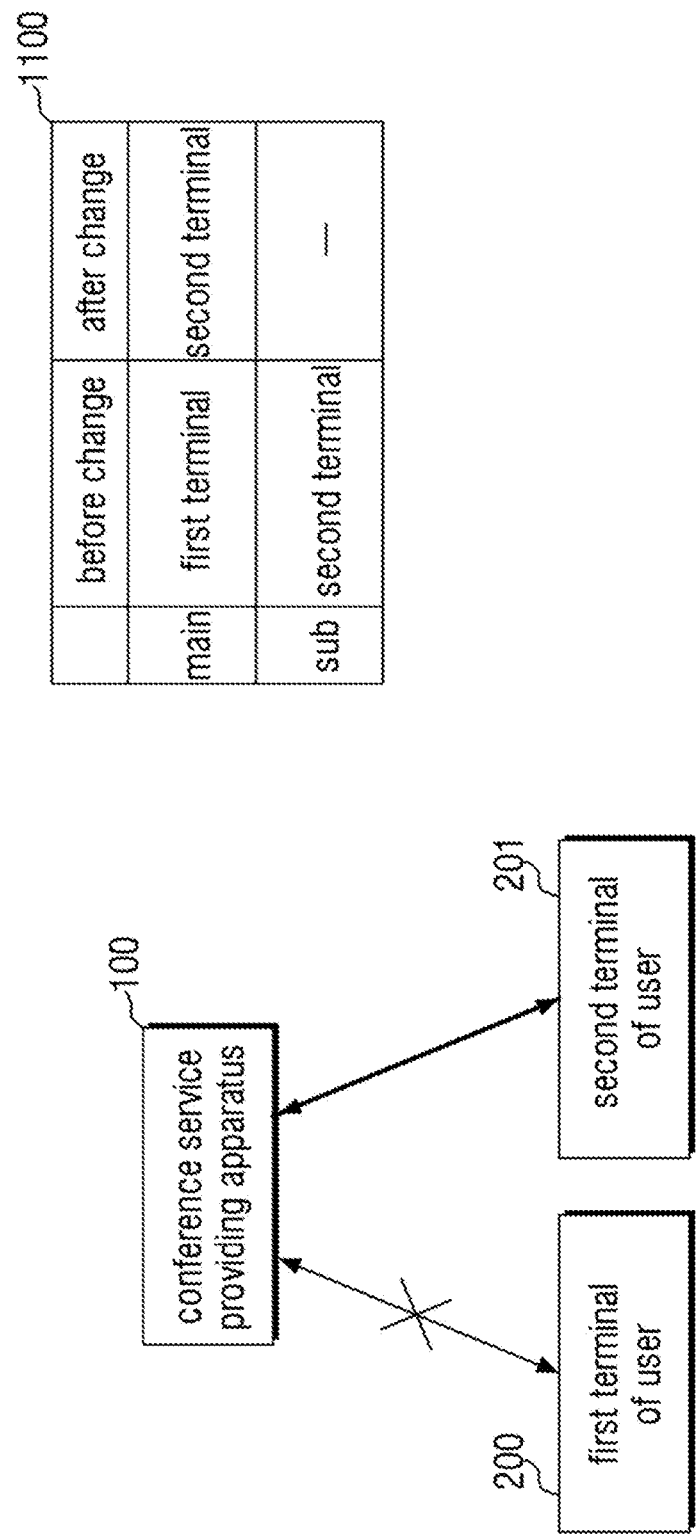
FIG. 11 is an exemplary diagram for explaining the role change of terminals depending on whether or not a conference service is connected according to still another embodiment of the present invention.

FIG. 11 is an exemplary diagram for explaining the role change of terminals depending on whether or not a conference service is connected according to still another embodiment of the present invention.

Referring to FIG. 11, in step 30 (S30), the conference service providing apparatus 100 may determine the connection status of the first terminal 200 of the user. As a result of the determination, when the first terminal 200 of the user is not connected, the conference service providing apparatus 100 may transmit the first contents to the second terminal 201 of the user.

That is, when any one of the terminals registered in the conference service for users is not connected to the conference service providing apparatus 100 due to low battery charge, bad communication, system down, or the like, the conference service providing apparatus 100 may detect these phenomena and change the role of the registered terminals.

Referring to the table 1100 of FIG. 11, it is assumed that, before the change, the first terminal 200 is a main terminal, and the second terminal 201 is a sub terminal. When the first terminal 200 is disconnected, the conference service providing apparatus 100 may change the main terminal to the second terminal 201. In this case, the first contents may be output through the second terminal 201. That is, the second terminal 201 may serve as the existing first terminal 200. In contrast, the function of the existing second terminal 201, that is, the transmission of conference participation request may be restricted. Alternatively, the conference service providing apparatus 100 may allow the second terminal 201 to perform all the functions of the main terminal and the sub terminal.

Meanwhile, when the first terminal of the user is not connected, the conference service providing apparatus 100 may transmit a message to the second terminal 201 of the user to determine whether to receive the first contents through the second terminal 201 of the user. The user determines whether the user attempts to reconnect the first terminal 200, allows the second terminal 201 to replace the first terminal 200 as described, or attempts to connect the third terminal.

The conference service providing apparatus 100 may transmit the first contents to the second terminal of the user when it receives a message of determining the reception of the first contents from the second terminal 201.

Up to now, mainly, a case where a user receives a conference service using a plurality of terminals has been described. According to another embodiment of the present invention, even when the user uses one terminal, the conference service can be provided. This is a case where a plurality of participants participates in a conference.

FIG. 12 is an exemplary diagram for explaining the environment for providing a conference service in a conference in which a plurality of participants participate according to still another embodiment of the present invention. FIG. 13 is an exemplary diagram for explaining a process of outputting user contents through user terminals, which is referred to in some embodiments of the present invention. Hereinafter, details overlapping the description of embodiments in the case where the user uses a plurality of terminals will be omitted. Hereinafter, it will be assumed that the second terminal 201 of FIG. 13 is a terminal of the user.

Referring to FIG. 12, the conference service providing apparatus 100 outputs the first contents through a monitor included in the output device 108. In addition, the conference service providing apparatus 100 outputs conference contents through a voice included in the output device 108. In FIG. 12, a plurality of conference participants 1202 are shown, and the conference service providing apparatus 100 may be controlled by a conference host 1201. It is assumed that a user 1203 performs a gesture input for changing the altitude of the terminal of the user 1203. In addition, it is assumed that another participant 1204 also performs the same gesture input.

Referring to FIGS. 12 and 13, the conference service providing apparatus 100 may receive the identification information of the user and the identification information of the terminal of the user from the terminal of the user. Further, the conference service providing apparatus 100 may output the first contents. At this time, the conference service providing apparatus 100 may receive a conference participation request generated by the gesture input of the user with respect to the terminal 201 of the user. In FIG. 12, a case where the user 1203 and another participant 1204 conduct a conference participation request is shown as an example.

The conference service providing apparatus 100 may receive the user contents through the user terminal in response to the received conference participation request. For example, when the priority of the user 1203 among the user 1203 and another participant 1204 is high, or when the conference host 1201 grants a voice to the user 1203, the user 1203 may input voice contents as user contents through the microphone of the user terminal 201.

The conference service providing apparatus 100 may receive the user contents and reflect the received user contents on the first contents. The reflected user contents may be output through the speaker 108 while the first contents are output through the monitor of FIG. 12.

Specifically describing the process of receiving the user contents by the conference service providing apparatus 100, the conference service providing apparatus 100 may transmit a control command for activating at least one input device of the terminal 201 of the user in response to the participation request of the user. In addition, the conference service providing apparatus 100 may receive the user contents input from the terminal 201 of the user through at least one input device activated by the control command.

If a conference participation request generated from the terminal 201 of the user is received, it is assumed that a conference participation request of another participant exists in addition to the received conference participation request.

In this case, the conference service providing apparatus 100 may determine the priority between the received conference participation requests based on at least one of the identification information of the user and the history of the received conference participation requests. Further, according to the determined priority, the conference service providing apparatus 100 may transmit a control command for activating at least one input device of the terminal that has transmitted the conference participation request having a higher priority. Next, the conference service providing apparatus 100 may receive the contents input through the at least one input device activated by the control command from the terminal that has transmitted the conference participation request having the higher priority.

The methods according to embodiments of the present invention that have described as above with reference to the attached drawings can be performed by the execution of a computer program embodied in a computer-readable code. The computer program may be transmitted from a first computing device to a second computing device through a network such as internet to be installed in the second computing device, and thus may be used in the second computing device. The first computing device and the second computing device include a server device, a fixed computing device such as a desktop PC, and a mobile computing device such as a notebook, a smart phone or a tablet PC.

As described above, according to the present invention, participants participate in a conference in real time in different spaces, but they provide the same experience as participating in an offline conference.

Further, according to the present invention, even when conference contents cannot be received through a connected terminal, the conference contents can be received through another terminal, thereby receiving stable conference contents.

Further, according to the present invention, in a conference attended by a large number of participants, it is possible to make a smooth meeting by granting a voice based on the input of participant's terminals.

The effects of the present invention are not limited by the foregoing, and other various effects are anticipated herein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for providing a conference service, which is executed by a conference service apparatus, the method comprising:
receiving, by a server, first identification information of a first user and second identification information of a first terminal, which is registered in the conference service apparatus for the first user, from the first terminal registered for the first user;
receiving, by the server, the first identification information of the first user and third identification information of a second terminal comprising sensors for receiving the first user's gesture input, which is registered in the conference service apparatus for the first user, from the second terminal registered for the first user;
storing the first identification information, the second identification information, and the third identification information at the server;
transmitting first content from the server to the first terminal registered for the first user; and
receiving, by the server and from the second terminal registered for the first user, first reaction information about the first content, the first reaction information generated by the first user's gesture input.

2. The method of claim 1, further comprising:
extracting a first request from the first reaction information; and
generating second content corresponding to the first request.

3. The method of claim 2, further comprising:
transmitting the second content corresponding to the first request to one of the first terminal registered for the first user and the second terminal registered for the first user, wherein the second content includes a control command for activating at least one of an input device and an output device of the second terminal registered for the first user, the at least one of the input device and the output device being associated with an attribute of the first content;
receiving an input from the input device of the second terminal having received the second content; and
generating third content corresponding to the received input.

4. The method of claim 2, wherein a second user is associated with a third terminal and a fourth terminal, the method further comprising:
receiving second reaction information from the fourth terminal registered for the second user;
extracting a second request from the second reaction information;
generating third content corresponding to one of the first request and the second request based on priorities respectively assigned to the first user and the second user; and
transmitting the third content to at least one of the first terminal of the first user, the second terminal of the first user, the third terminal of the second user, and the fourth terminal registered for the second user.

5. The method of claim 4, wherein the third content includes a control command for activating at least one of an input device and an output device of a terminal of a user, between the first user and the second user, having a higher priority, the at least one of the input device and the output device being associated with an attribute of the first content, and
wherein the method further comprises:
receiving an input through the input device activated by the control command; and
generating fourth content corresponding to the received input.

6. The method of claim 3, wherein the generated third content reflects user input content in response to the first request matching the first content.

7. The method of claim 1, further comprising:
determining a connection status of the first terminal of the first user; and
transmitting the first content to the second terminal of the first user in response to the determination indicating that the first terminal of the first user is not connected to the conference service apparatus.

\* \* \* \* \*